(12) United States Patent
Dubash et al.

(10) Patent No.: US 8,270,921 B2
(45) Date of Patent: Sep. 18, 2012

(54) SYSTEMS AND METHODS FOR TUNING AN ANTENNA FOR A FREQUENCY MODULATION TRANSCEIVER

(75) Inventors: Noshir Dubash, Chandler, AZ (US); Thomas E. Ricks, Jr., Tempe, AZ (US); Richard J. McConnell, Rancho Cucamonga, CA (US)

(73) Assignee: CSR Technology Inc., Sunnyvale, CA (US)

( * ) Notice: Subject to any disclaimer, the term of this patent is extended or adjusted under 35 U.S.C. 154(b) by 498 days.

(21) Appl. No.: 12/430,280

(22) Filed: Apr. 27, 2009

(65) Prior Publication Data

US 2010/0273441 A1    Oct. 28, 2010

(51) Int. Cl.
H04B 1/18 (2006.01)
(52) U.S. Cl. .... 455/192.2; 455/77; 455/107; 455/193.1; 455/226.1
(58) Field of Classification Search ............ 455/77, 455/107, 115.3, 193.1, 226.1, 226.2
See application file for complete search history.

(56) References Cited

U.S. PATENT DOCUMENTS

| | | | | |
|---|---|---|---|---|
| 3,809,874 | A | * | 5/1974 | Pozzetti et al. ........... 708/805 |
| 6,160,449 | A | * | 12/2000 | Klomsdorf et al. ........ 330/149 |
| 2003/0119469 | A1 | | 6/2003 | Karr |
| 2007/0149146 | A1 | * | 6/2007 | Hwang et al. ............. 455/80 |
| 2007/0232236 | A1 | * | 10/2007 | Kasha et al. ............ 455/67.14 |
| 2008/0045162 | A1 | | 2/2008 | Rofougaran |

FOREIGN PATENT DOCUMENTS

| | | |
|---|---|---|
| WO | 2009086159 | 9/2009 |
| WO | 2009124874 | 10/2009 |

OTHER PUBLICATIONS

Silicon Laboratories, Broadcast FM Radio Transceiver for Portable Applications, Jan. 18, 2007.

* cited by examiner

Primary Examiner — Lincoln Donovan
Assistant Examiner — Shikha Goyal
(74) Attorney, Agent, or Firm — Next IP Law Group LLP; Minh N. Nguyen, Esq.

(57) ABSTRACT

Systems and methods for tuning an antenna for a frequency modulation (FM) transceiver are provided. A representative system includes: a network of electrical adjustable passive components that receives and sends radio frequency (RF) signals to a receiver circuitry via the network of electrical adjustable passive components. The receiver circuitry determines the received signal strength indication (RSSI) of the RF signal. The system further includes a transmitter circuitry that transmits RF signals via the network of electrical adjustable passive components, and a peak detector circuitry that receives and determines a voltage output of the RF signals from the variable capacitors. An auto-tune circuitry receives the RSSI and output value from the receiver circuitry and the peak detector circuitry, respectively. The auto-tune circuitry is configured to adjust capacitance values of at least one of the serial variable capacitor and the parallel variable capacitor based on the RSSI and the voltage output during the reception and transmission of the RF signals, respectively.

26 Claims, 8 Drawing Sheets

SYSTEMS AND METHODS FOR TUNING AN ANTENNA FOR A FREQUENCY MODULATION TRANSCEIVER

TECHNICAL FIELD

The present disclosure is generally related to frequency modulation broadcasting and, more particularly, is related to systems and methods for tuning an antenna for a frequency modulation (FM) transceiver.

BACKGROUND

Cellular phone handsets with integrated frequency modulation (FM) receivers available in the market today use the headphone wire as a FM antenna. This one meter long wire can serve as an efficient monopole antenna at FM radio frequencies in the 100 MHz range. As the use of wireless headphones becomes prevalent there is a high demand to integrate the FM antenna within the cellular phone. The antenna length that can be integrated into a typical handset is about ⅕₀th the FM wavelength making it lossy and inefficient. A typical integrated FM antenna can have 20 dB to 30 dB less gain than a headphone wire antenna. Thus, impedance matching to the antenna can help in transmitting and receiving signals using the antenna.

The impedance of an integrated FM antenna can depend heavily on the phone or platform it is integrated into. It can be affected by the proximity of metals and ground-planes around it in the phone, by the phone body and construction, and by human body effect when the phone is held or in proximity to the human body. Thus, the performance of the receiver varies due to these uncertainties.

Phones with integrated FM transmitters are not typically concerned with impedance matching the transmitter to the antenna because the transmitter can simply run at higher power to compensate for the mismatch loss. This is the technique utilized by existing solutions.

SUMMARY

Systems and methods for tuning an antenna for a frequency modulation (FM) transceiver are provided. A representative system includes: a network of electrical adjustable passive components that receives and sends radio frequency (RF) signals to a receiver circuitry via the network of electrical adjustable passive components. The receiver circuitry determines the received signal strength indication (RSSI) of the RF signal. The system further includes a transmitter circuitry that transmits RF signals via the network of electrical adjustable passive components, and a peak detector circuitry that receives and determines a voltage output of the RF signals from the variable capacitors. An auto-tune circuitry receives the RSSI and output value from the receiver circuitry and the peak detector circuitry, respectively. The auto-tune circuitry is configured to adjust capacitance values of at least one of the serial variable capacitor and the parallel variable capacitor based on the RSSI and the voltage output during the reception and transmission of the RF signals, respectively.

Other systems, devices, methods, features of the disclosure will become apparent to one skilled in the art upon examination of the following FIGS. and detailed description. It is intended that all such systems, devices, methods and features be included within the scope of the disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon, clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which an antenna for a frequency modulation (FM) transceiver can be auto tuned.

An antenna tuner circuitry disclosed herein is efficient in maximizing the sensitivity and minimizing the power consumption of integrated FM transceivers using integrated antennas. This antenna tuner circuitry can maximize the receiver sensitivity for a variety of antennas and environmental conditions. However, to minimize power consumption, which is potentially critical in battery operated handsets, the antenna tuner circuitry can optimize the impedance matching to the antenna. A network of electrical adjustable passive components disclosed herein can match the transceiver impedance to the variable antenna impedance.

Figure 1:
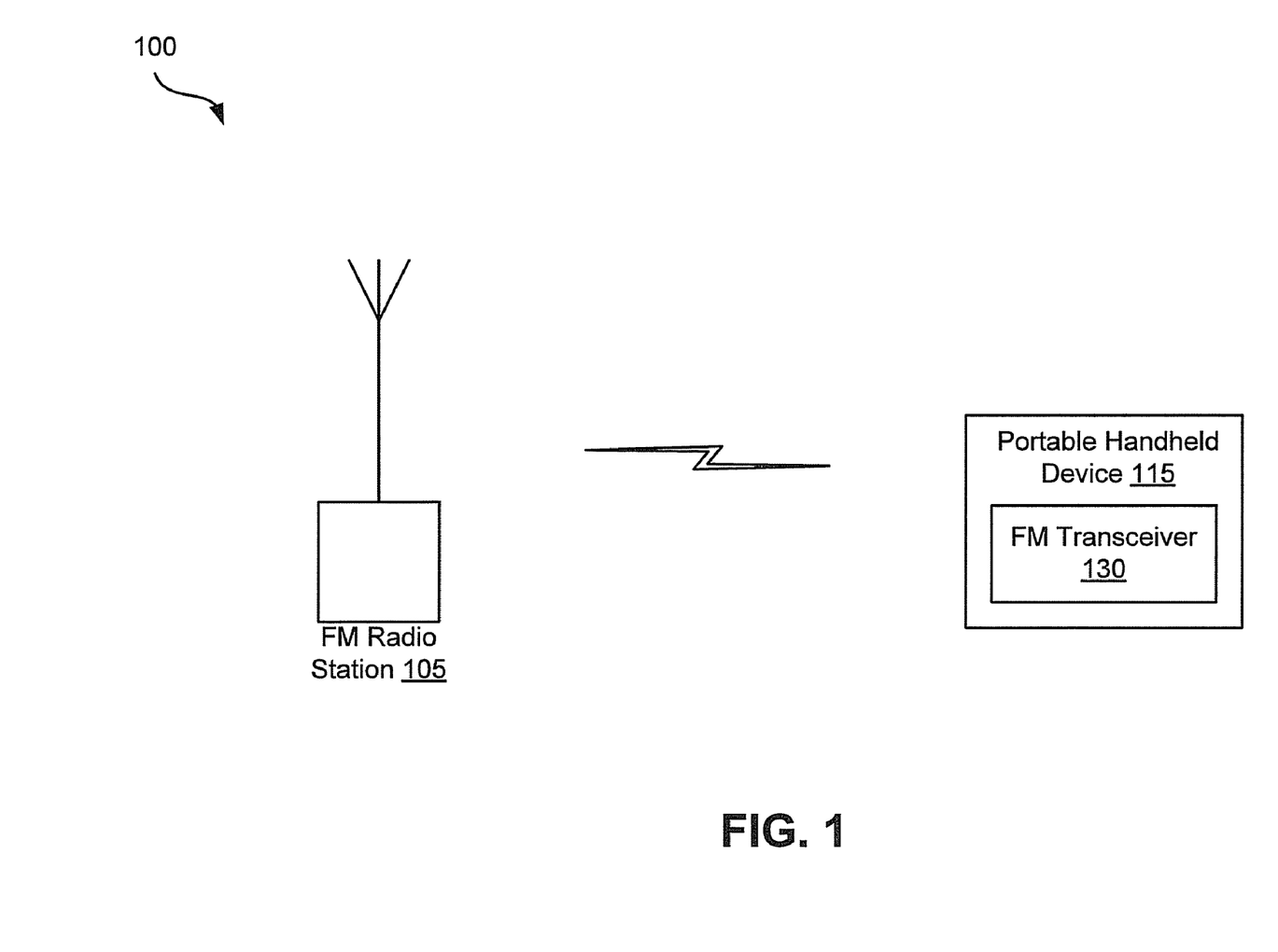
FIG. 1 is a block diagram that illustrates an embodiment of a frequency modulation (FM) broadcasting system.

FIG. 1 is a block diagram that illustrates an embodiment of a FM broadcasting system. The system 100 includes a FM radio station 105 that transmits radio frequency (RF) signals to a portable handheld device 115 that includes a FM transceiver 130. The portable handheld device 115 includes any mobile or portable handheld device, such as, a cell phone, PDA, laptop, multi-media device, or any other similar devices. The FM transceiver 130 includes an antenna tuner circuitry 215 (FIG. 2) that facilitates matching impedance of an antenna 205 (FIG. 2) to a receiver circuitry 220 and transmitter circuitry 225 (FIG. 2) of the FM transceiver 130. The antenna tuner circuitry 215 is further described in relation to FIGS. 2 and 5-7.

Figure 2:
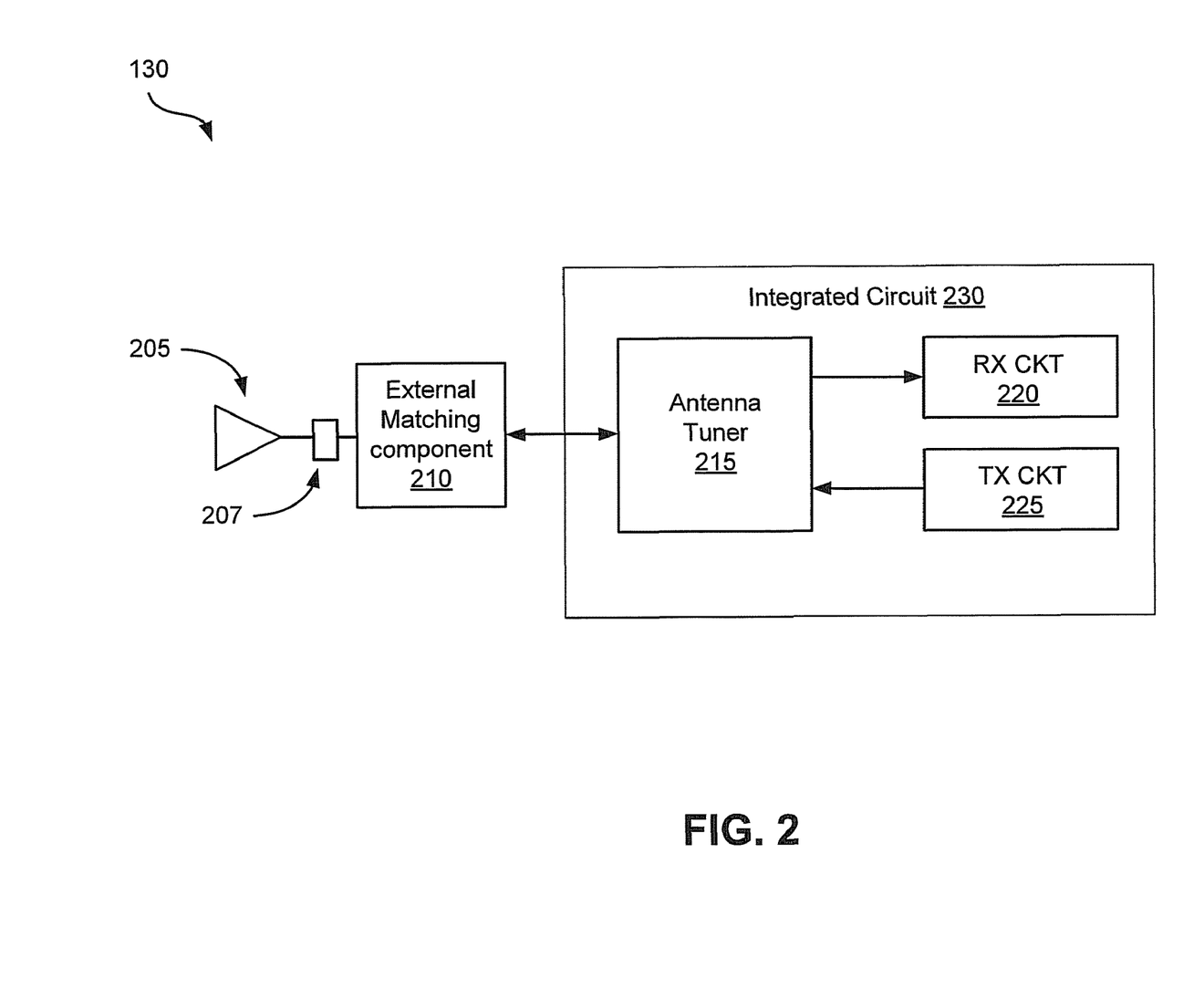
FIG. 2 is a high-level block diagram that illustrates an embodiment of a FM transceiver, such as that shown in FIG. 1.

FIG. 2 is a high-level block diagram that illustrates an embodiment of a FM transceiver 130, such as that shown in FIG. 1. The FM transceiver 130 includes an antenna 205 that is coupled to a single antenna port 207, which is electrically coupled to an external matching component 210. The FM transceiver 130 further includes an antenna tuner circuitry 215 that is electrically coupled to the external matching component 210, receiver circuitry 220 and transmitter circuitry 225. The antenna tuner circuitry 215 facilitates matching impedance between the antenna 205, and the receiver and transmitter circuitries 220, 225.

In this example, the antenna tuner circuitry 215, receiver circuitry 220, and transmitter circuitry 225 can be designed as part of an integrated circuit 230. It should be noted that the antenna tuner circuitry 215, receiver circuitry 220, and transmitter circuitry 225 can be designed as part of other circuitry other than an integrated circuit 230. The antenna 205 receives RF signals from radio waves and sends the RF signals to the external matching component 210, which facilitates matching impedance between the antenna 205, and the receiver and transmitter circuitries 220, 225.

Figure 3:
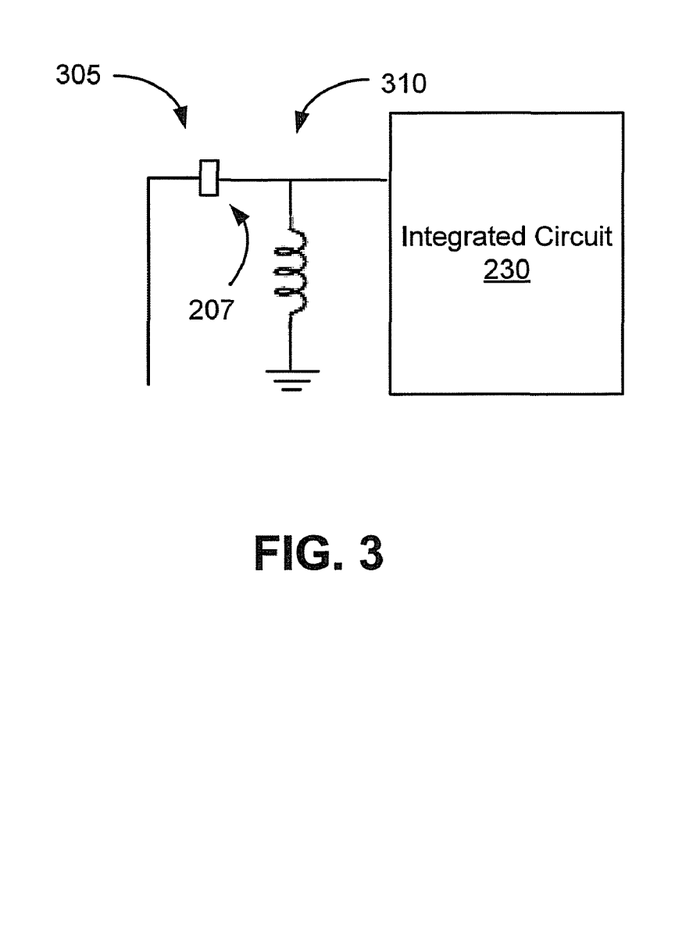
FIGS. 3 and 4 are block diagrams that illustrate embodiments of an antenna and an external matching component, such as that shown in FIG. 2.
Figure 4:
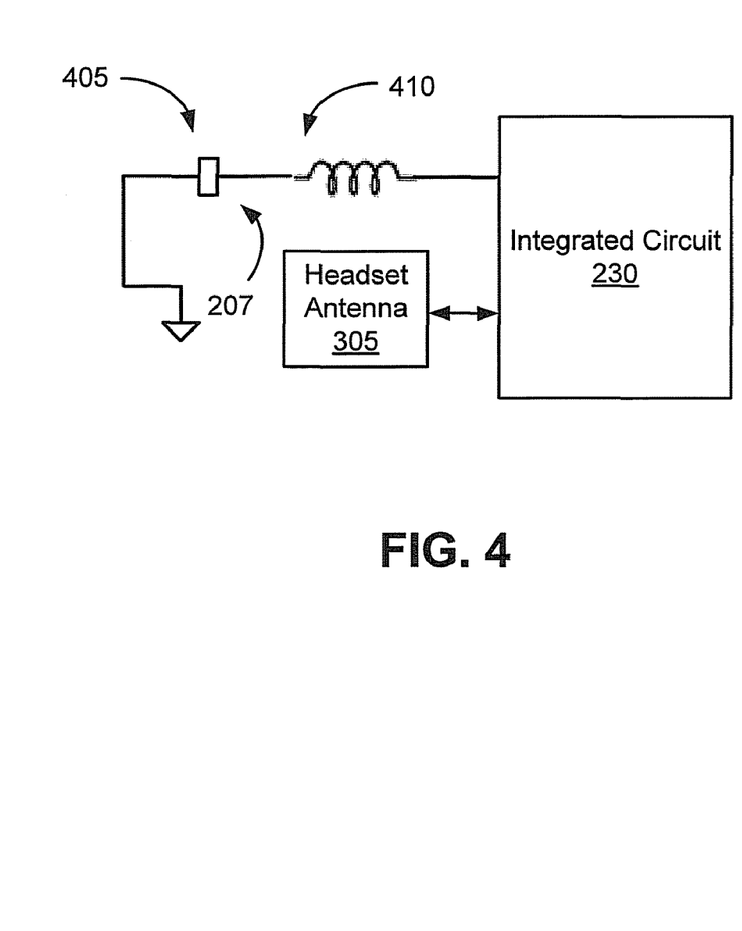

FIGS. 3 and 4 are block diagrams that illustrate embodiments of an antenna 205 and an external matching component 210, such as that shown in FIG. 2. Referring to FIG. 3, the antenna 205 is an open circuit antenna coupled to the single antenna port 207 that is coupled to the external matching component 310. In this example the external matching component 310 is a parallel inductor. Referring to FIG. 4, the antenna 205 is a closed loop antenna 405 which is coupled to the single antenna port 207 that is coupled to the external matching component 410. In this example the external matching component 410 is a serial inductor.

Figure 5:
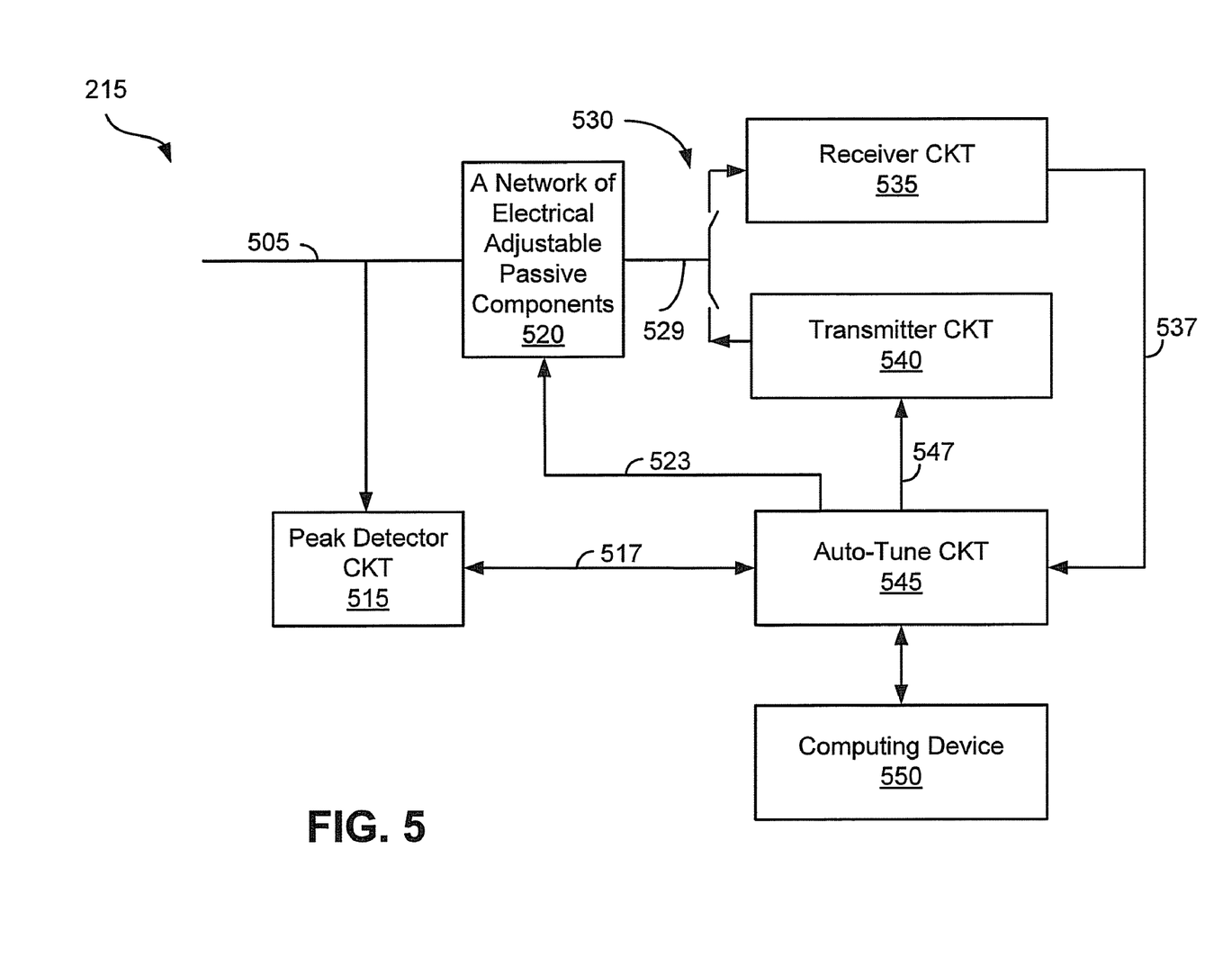
FIG. 5 is a high-level block diagram that illustrates an embodiment of an antenna tuner circuitry, such as that shown in FIG. 2.

FIG. 5 is a high-level block diagram that illustrates an embodiment of an antenna tuner circuitry 215, such as that shown in FIG. 2. The antenna tuner circuitry 215 includes a network 520 of electrical adjustable passive components that receives RF signals via line 505. The network 520 of electrical adjustable passive components includes at least one of the following passive components; one or more variable parallel capacitors, one or more variable serial capacitors, one or more parallel capacitors, one or more serial capacitors, one or more variable parallel inductors, one or more variable serial inductors, one or more parallel inductors, one or more serial inductors, one or more variable parallel resistors, one or more variable serial resistors, one or more parallel resistors, and one or more serial resistors.

A receiver circuitry 535 receives the RF signals via line 529 through the network 520 of electrical adjustable passive components and determines the received signal strength indication (RSSI) of the RF signals. A transmitter circuitry 540 transmits RF signals via line 505 through the network 520 of electrical adjustable passive components. A peak detector circuitry 515 receives the transmitting RF signals via line 505 and determines a voltage output of the transmitting RF signals from the network 520 of electrical adjustable passive components.

An auto-tune circuitry 545 receives the voltage output and RSSI via lines 517, 537 from the peak detector circuitry 515 and the receiver circuitry 535, respectively. The auto-tune circuitry 545 adjusts passive component values of the network 520 of electrical adjustable passive components via line 523 based on the voltage output and RSSI via lines 517, 537 during the transmission and reception of the RF signals, respectively. The auto-tune circuitry 545 adjusts the transmission power of the transmitter circuitry 540 and the peak detection sensitivity via lines 547, 517 based on the voltage output from the peak detector circuitry 515. An exemplary method of tuning the antenna 205 is described in relation to FIG. 7.

Alternatively or additionally, before the receiving the RF signals by the receiver circuitry 535, the auto-tune circuitry 545 can tune the antenna 205 (FIG. 2) by first disabling the receiver circuitry 535 and enabling the transmitter circuitry 540 and peak detector circuitry 515. The auto-tune circuitry 545 adjusts the passive component values of the network 520 of electrical adjustable passive components based on the voltage output of the peak detector circuitry 515 during the transmission of the RF signals by the transmitter circuitry 540. Once the antenna 205 is tuned, the auto-tune circuitry 545 disables the transmitter circuitry 540 and peak detector circuitry 515, and enables the receiver circuitry 535 for receiving RF signals and/or tuning the antenna 205 to the receiver circuitry 535.

The auto-tune circuitry 545 can further be coupled to a computing device 550 that can be used to configure and check the status of the auto-tune circuitry 545. A switching circuit 530 is electrically coupled to the network 520 of electrical adjustable passive components, receiver circuitry 535 and transmitter circuitry 540. The switching circuit 530 is configured to isolate the receiver circuitry 535 and the transmitter circuitry 540 from each other based on whether the receiver circuitry 535 is receiving RF signals or the transmitter circuitry 540 is transmitting RF signals.

Figure 6:
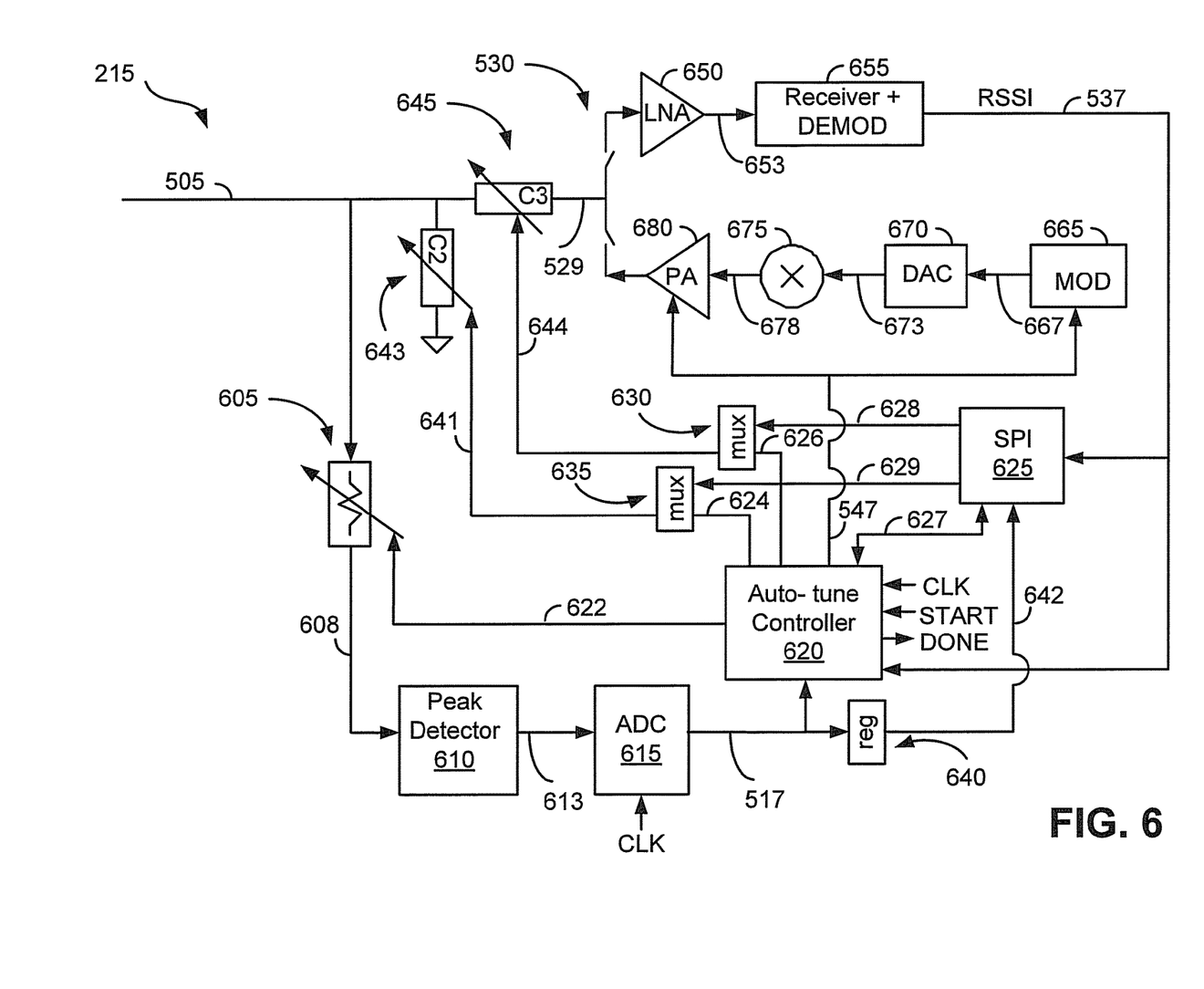
FIG. 6 is a detailed block diagram that illustrates an embodiment of an antenna tuner circuitry, such as that shown in FIG. 5.

FIG. 6 is a detailed block diagram that illustrates an embodiment of an antenna tuner circuitry 215, such as that shown in FIG. 5. In this example, the network 520 of electrical adjustable passive components includes a variable serial capacitor 645 and a variable parallel capacitor 643. The receiver circuitry 535 (FIG. 5) receives the RF signals via the variable serial capacitor 645 and the switching circuit 530. The receiver circuitry 535 includes a low noise amplifier 650 that amplifies and sends the RF signals via line 653 to a receiver/demodulator 655, which determines and generates the RSSI based on the received RF signals. The switching circuit 530 electrically couples the low noise amplifier 650 to the variable serial capacitor 645 and electrically isolates the transmitter circuitry 540 during the reception of RF signals.

The transmitter circuitry 540 includes a modulator 665 that sends a modulated signal via line 667 to a digital to analog converter (DAC) 670, which converts the modulated signals to analog signals. A mixer 675 receives the analog signals via line 673, mixes the analog signals and sends the mixed signals via line 678 to a power amplifier 680, which amplifies the mixed signals. The switching circuit 530 electrically couples the power amplifier 680 to the variable serial capacitor 645 and electrically isolates the receiver circuitry 535 during the transmission of RF signals. The power amplifier 680 transmits the amplified signal via line 505 through the variable parallel and serial capacitors 643, 645.

The peak detector circuitry 515 includes a variable resistor 605 that receives transmitting RF signals via line 505 from the transmitter circuitry 540 and sends the transmitting RF signals via line 608 to a peak detector 610 which determines the voltage output of the transmitting RF signals. An analog to digital converter (ADC) 615 receives the voltage output via line 613 and converts the voltage output to a digital signal.

The auto-tune circuitry 545 includes an auto-tune controller 620 that receives the digital signal via line 517 from the ADC 615 and adjusts the capacitance values of the variable parallel capacitor 643 and/or the variable serial capacitor 645 based on the digital signal and RSSI via lines 517, 537 during the transmission and reception of the RF signals, respectively. The auto-tune controller 620 can adjust the capacitance values via the multiplexers 630, 635. The auto-tune controller 620 can further adjust the transmitted power by adjusting the gain of the power amplifier 680 and/or by adjust the gain of the modulator 665 via line 547 during the transmission of the RF signals. The auto-tune controller 620 can further adjust the resistance values of the variable resistor 605 via line 622 based on the digital signal from the ADC 615 during the transmission of the RF signals.

The auto-tune circuitry 545 can further include a computing device 550 (FIG. 5) by using a serial port interface 625. The computing device 550 can be used to configure and check the status of the auto-tune controller 620. Alternatively or additionally, the computing device 550 receives the digital signal and RSSI from a register 640 and the receiver/demodulator 655 via lines 642, 537, respectively, and can be programmed to perform the same functions as the auto-tune controller 620, such as, adjusting the gain of the power amplifier 680, the capacitance values of the variable capacitors 643, 645 and the resistance values of the variable resistor 605. Alternatively or additionally, the computing device 550 can be used in combination with the auto-tune controller 620 to tune the antenna 205 (FIG. 2).

Figure 7:
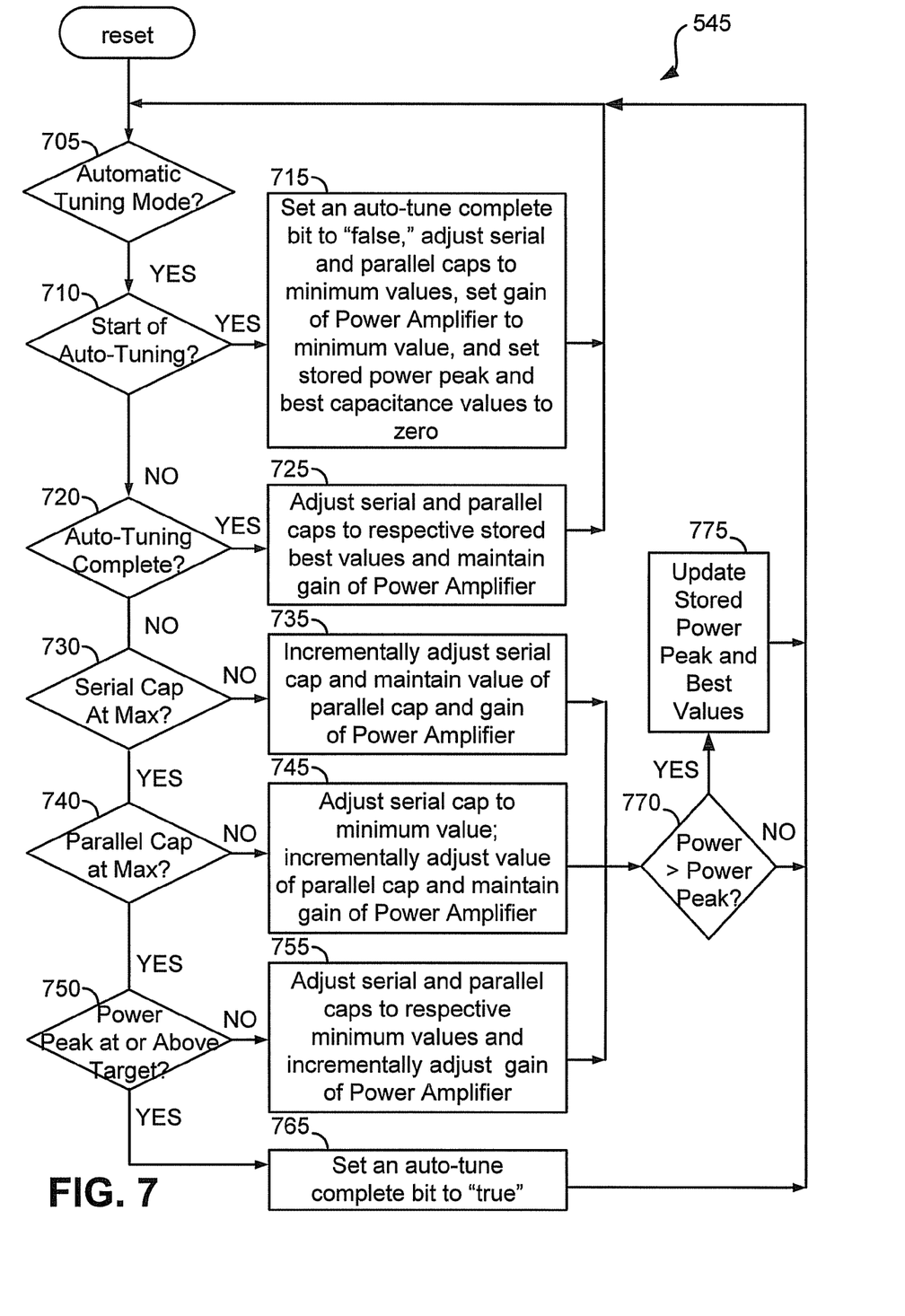
FIG. 7 is a flow diagram that illustrates an embodiment of the architecture, functionality, and/or operation of an auto-tune circuitry, such as that shown in FIG. 5, that is in a transmitting mode.

FIG. 7 is a flow diagram that illustrates an embodiment of the architecture, functionality and/or operation of an auto-tune circuitry 545, such as that shown in FIG. 5, that is in a transmitting mode. Beginning with step 705, the auto-tune circuitry 545 (FIG. 5) determines whether the FM transceiver 130 (FIG. 1) is in automatic tuning mode. At step 710, responsive to determining that the FM transceiver 130 is starting the automatic tuning mode, the auto-tune circuitry 545 at step 715 sets an auto-tune complete bit to "false," adjusts the variable serial and/or parallel capacitors 645, 643 (FIG. 6) and gain of a power amplifier 680 (FIG. 6) of the transmitter circuitry 540 to their respective predetermined minimal values, and sets stored power peak of the peak detector circuitry 515 (FIG. 5) and best capacitance values to zero. Responsive to determining that the FM transceiver 130 already started the automatic tuning mode, the auto-tune circuitry 545 at step 720 determines whether the auto-tune complete bit is "true."

Responsive to determining that the auto-tune complete bit is "true", the auto-tune circuitry 545 at step 725 adjusts the variable serial and parallel capacitors 645, 643 to their respective stored best capacitance values and maintains the existing gain of the power amplifier 680. Responsive to determining that the auto-tune complete bit is "false", the auto-tune circuitry 545 at step 730 determines whether the variable serial capacitor 645 is at its predetermined maximal value. Responsive to determining that the variable serial capacitor 645 is not at its predetermined maximal value, the auto-tune circuitry 545 at step 735 incrementally adjusts the capacitance value of the variable serial capacitor 645, and maintains the existing value and gain of the variable parallel capacitor 643 and the power amplifier 680, respectively.

In step 770, the auto-tune circuitry 545 determines whether the output value of the peak detector 610 is greater than the stored power peak value using the incremented capacitance value of the variable serial capacitor 645. If so, the auto-tune circuitry 545 at step 775 updates the stored power peak value with the output value, the best capacitance value of the variable serial capacitor 645 with the incremented capacitance value, and the best capacitance value of the parallel capacitor 643 with the current value. If the output value is not greater than the stored power peak value, the auto-tune circuitry 545 goes to steps 705. It should be noted that steps 730, 735, 770, and 775 can be repeated until the variable serial capacitor 645 cannot be incrementally adjusted any further.

Responsive to determining that the variable serial capacitor 645 is at its predetermined maximal value, the auto-tune circuitry 545 at step 740 determines whether the variable parallel capacitor 643 is at its predetermined maximal value. Responsive to determining that the variable parallel capacitor 643 is not at its predetermined maximal value, the auto-tune circuitry 545 at step 745 adjusts the variable serial capacitor 645 to its predetermined minimal capacitance value, incrementally adjusts the capacitance value of the variable parallel capacitor 643 and maintains the exiting gain of the power amplifier 680.

In step 770, the auto-tune circuitry 545 determines whether the output value of the peak detector 610 is greater than the stored power peak value using the incremented capacitance value of the variable parallel capacitor 643. If so, the auto-tune circuitry 545 updates the stored power peak value with the output value, the best capacitance value of the variable parallel capacitor 643 with the incremented capacitance value, and the best capacitance value of the serial capacitor 645 with the current value. If the output value is not greater than the stored power peak value, the auto-tune circuitry 545 goes to steps 705. It should be noted that steps 740, 770, and 775 can be repeated until the variable parallel capacitor 643 cannot be incrementally adjusted any further.

Responsive to determining that the variable parallel capacitor 643 is at its predetermined maximal value, the auto-tune circuitry 545 at step 750 determines whether the stored power peak value is greater than or equal to a predetermined target power value. Responsive to determining that the stored power peak value is less that the target power value, the auto-tune circuitry 545 at step 755 adjusts the variable serial and parallel capacitors 645, 643 to their respective predetermined minimum capacitance values and incrementally adjusts the gain of the power amplifier 680.

In step 770, the auto-tune circuitry 545 determines whether the output value of the peak detector 610 is greater than the stored power peak value. If so, the auto-tune circuitry 545 updates the stored power peak value with the output value and the best capacitance values with the current values of the parallel capacitor 643 and the serial capacitor 645. If the output value is not greater than the stored power peak value, the auto-tune circuitry 545 goes to steps 705. It should be noted that steps 750, 755, 770, and 775 can be repeated until the stored power peak value exceeds the target power value.

Responsive to determining that the stored power peak value is greater than or equal to a predetermined target power value, the auto-tune circuitry 545 at step 765 sets the auto-tune complete bit to "true." It should be noted that after performing steps 715, 725, and 765, the auto-tune circuitry 545 goes back to step 705. It should be noted that the flow diagram in general searches for the maximal power peak which is greater than or equal to a target power value by adjusting values of three parameters. Each parameter can be adjusted while the other parameters can be fixed at a single value. In FIG. 7, the three parameters include the variable serial and parallel capacitors 645, 643 and the transmitter circuitry 540.

Figure 8:
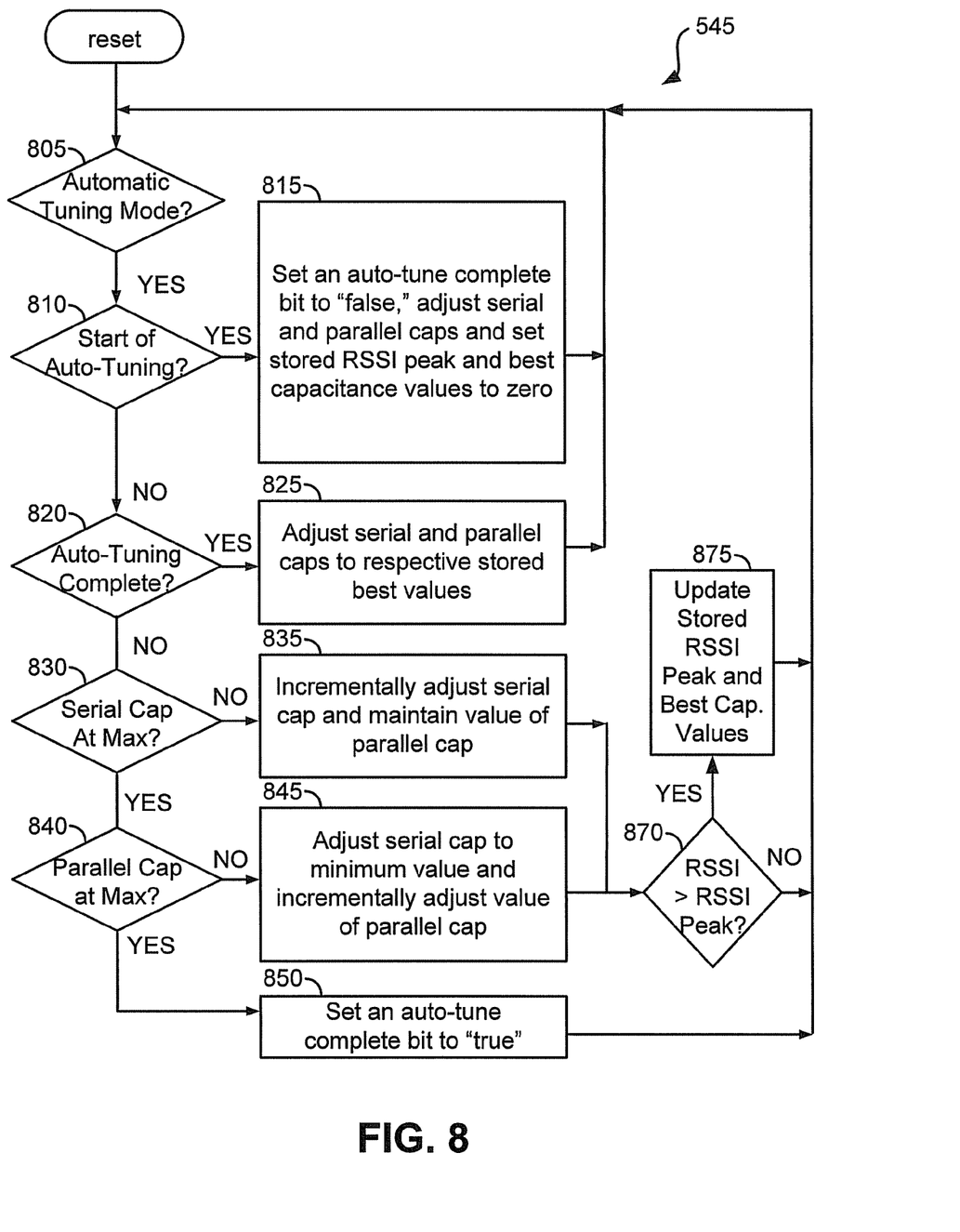
FIG. 8 is a flow diagram that illustrates an embodiment of the architecture, functionality and/or operation of an auto-tune circuitry, such as that shown in FIG. 5, that is in a receiving mode.

FIG. 8 is a flow diagram that illustrates an embodiment of the architecture, functionality and/or operation of an auto-tune circuitry 545, such as that shown in FIG. 5, that is in a receiving mode. Beginning with step 805, the auto-tune circuitry 545 (FIG. 5) determines whether the FM transceiver 130 (FIG. 1) is in automatic tuning mode. At step 810, responsive to determining that the FM transceiver 130 is starting the automatic tuning mode, the auto-tune circuitry 545 at step 815 sets an auto-tune complete bit to "false," adjusts the variable serial and/or parallel capacitors 645, 643 (FIG. 6) to their respective predetermined minimal capacitance values, and sets stored RSSI peak of the receiver circuitry 535 (FIG. 5) and best capacitance values to zero. Responsive to determining that the FM transceiver 130 already started the automatic tuning mode, the auto-tune circuitry 545 at step 820 determines whether the auto-tune complete bit is "true."

Responsive to determining that the auto-tune complete bit is "true", the auto-tune circuitry 545 at step 825 adjusts the variable serial and parallel capacitors 645, 643 to their respective stored best capacitance values. Responsive to determining that the auto-tune complete bit is "false", the auto-tune circuitry 545 at step 830 determines whether the variable serial capacitor 645 is at its predetermined maximal value. Responsive to determining that the variable serial capacitor 645 is not at its predetermined maximal value, the auto-tune circuitry 545 at step 835 incrementally adjusts the capacitance value of the variable serial capacitor 645 and maintains the existing value of the variable parallel capacitor 643.

In step 870, the auto-tune circuitry 545 determines whether the RSSI of the receiver 535 is greater than the stored RSSI peak value using the incremented capacitance value of the variable serial capacitor 645. If so, the auto-tune circuitry 545 at step 875 updates the stored RSSI peak value with the RSSI, the best capacitance value of the variable serial capacitor 645 with the incremented capacitance value, and the best capacitance value of the parallel capacitor 643 with the current value. If the output value is not greater than the stored RSSI peak value, the auto-tune circuitry 545 goes to steps 805. It should be noted that steps 830, 835, 870, and 875 can be repeated until the variable serial capacitor 645 cannot be incrementally adjusted any further.

Responsive to determining that the variable serial capacitor 645 is at its predetermined maximal value, the auto-tune circuitry 545 at step 840 determines whether the variable parallel capacitor 643 is at its predetermined maximal value. Responsive to determining that the variable parallel capacitor 643 is not at its predetermined maximal value, the auto-tune circuitry 545 at step 845 adjusts the variable serial capacitor 645 to its predetermined minimal capacitance value and incrementally adjusts the capacitance value of the variable parallel capacitor 643.

In step 870, the auto-tune circuitry 545 determines whether the RSSI of the receiver 535 is greater than the stored RSSI peak value using the incremented capacitance value of the variable parallel capacitor 643. If so, the auto-tune circuitry 545 at step 875 updates the stored RSSI peak value with the RSSI, the best capacitance value of the variable parallel capacitor 643 with the incremented capacitance value, and the best capacitance value of the serial capacitor 645 with the current value. If the output value is not greater than the stored RSSI peak value, the auto-tune circuitry 545 goes to steps 805. It should be noted that steps 840, 845, 870, and 875 can be repeated until the variable parallel capacitor 643 cannot be incrementally adjusted any further.

Responsive to determining that the variable parallel capacitor 643 is at its predetermined maximal value, the auto-tune circuitry 545 at step 850 sets the auto-tune complete bit to "true." It should be noted that after performing steps 815, 825, and 850, the auto-tune circuitry 545 goes back to step 805.

The variable serial and parallel capacitors 645, 643 in FIGS. 7 and 8 can be generalized to first and second types of variable passive, which not only includes variable capacitors, but also variable inductors and resistors. Thus, the antenna 205 can be tuned to the transceiver 130 in the transmitting and receiving modes by adjusting component values of the first and second types of variable passive. In addition, a third or Nth type of variable passive components can be included in the flow diagrams to be adjusted for tuning the antenna 205 to the transceiver 130.

Figure 9:
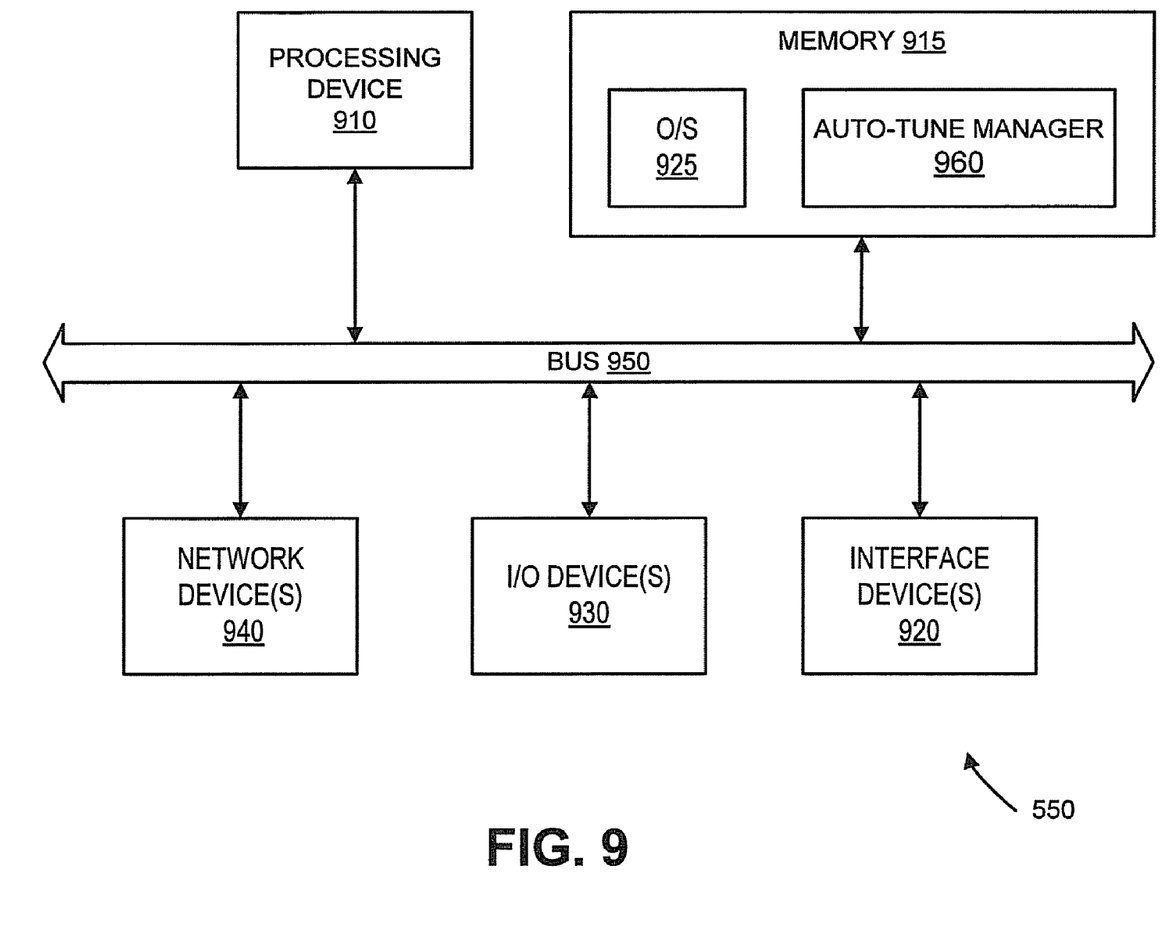
FIG. 9 is a block diagram illustrating an exemplary architecture for a computing device, such as that shown in FIG. 5.

FIG. 9 is a block diagram illustrating an exemplary architecture for a computing device 550, such as that shown in FIG. 5. As indicated in FIG. 6, the computing device 550 comprises a processing device 910, memory 915, one or more user interface devices 920, one or more I/O devices 930, and one or more networking devices 940, each of which is connected to a local interface 950. The processing device 910 can include any custom made or commercially available processor, a central processing unit (CPU) or an auxiliary processor among several processors associated with the computing device 550, a semiconductor based microprocessor (in the form of a microchip), or a macroprocessor. The memory 915 can include any one or a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 920 comprise those components with which the user (e.g., administrator) can interact with the computing device 550. Where the computing device 550 comprises a server computer or similar device, these components can comprise those typically used in conjunction with a PC such as a keyboard and mouse.

The one or more I/O devices 930 comprise components used to facilitate connection of the computing device 550 to other devices and therefore, for instance, comprise one or more serial, parallel, small system interface (SCSI), universal serial bus (USB), or IEEE 1394 (e.g., Firewire™) connection elements. The networking devices 940 comprise the various components used to transmit and/or receive data over networks (not shown), where provided. By way of example, the networking devices 940 include a device that can communicate both inputs and outputs, for instance, a modulator/demodulator (e.g., modem), a radio frequency (RF) or infrared (IR) transceiver, a telephonic interface, a bridge, a router, as well as a network card, etc.

The memory 915 normally comprises various programs (in software and/or firmware) including an operating system (O/S) 925 and an auto-tune manager 960. The O/S 925 controls the execution of programs, and provides scheduling, input-output control, file and data management, memory management, and communication control and related services. The auto-tune manager 960 having instructions that are executed by the processing device 910. The instructions of the auto-tune manager 960 include logics that are similar to the steps described in the flow chart of FIGS. 7 and 8.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

The invention is claimed:

1. A handheld device comprising:
a network of electrical adjustable passive components that receives RF signals;
a receiver circuitry that receives RF signals via the network of electrical adjustable passive components and determines the received signal strength indication (RSSI) of the RF signals;
a transmitter circuitry that transmits RF signals via the network of electrical adjustable passive components;
a peak detector circuitry that receives and determines a voltage output of the RF signals from the network of electrical adjustable passive components; and
an auto-tune circuitry that receives the RSSI and output value from the receiver circuitry and the peak detector circuitry, respectively, the auto-tune circuitry being configured to adjust passive component values of the network of electrical adjustable passive components based on the RSSI and the voltage output during the reception and transmission of the RF signals, respectively.

2. The handheld device as defined in claim 1, wherein the network of electrical adjustable passive components including at least one of the following passive components: one or more variable parallel capacitors, one or more variable serial capacitors, one or more parallel capacitors, one or more serial capacitors, one or more variable parallel inductors, one or more variable serial inductors, one or more parallel inductors, one or more serial inductors, one or more variable parallel resistors, one or more variable serial resistors, one or more parallel resistors, and one or more serial resistors.

3. The handheld device as defined in claim 1, wherein the auto-tune circuitry tunes an antenna for receiving RF signals by first disabling the receiver circuitry and enabling the transmitter circuitry and peak detector circuitry, the auto-tune circuitry being configured to adjust passive component values of the network of electrical adjustable passive components based on the voltage output of the peak detector circuitry during the transmission of the RF signals by the transmitter circuitry, once the antenna is tuned, the auto-tune circuitry being configured to disable the transmitter circuitry and peak detector circuitry and enable the receiver circuitry for receiving RF signals and/or tuning the antenna to the receiver circuitry.

4. The handheld device as defined in claim 1, further comprising:
an antenna that receives radio signals, the antenna including at least one of the following antennas: an open circuit antenna and a closed loop antenna; and
an external matching component that receives the RF signals from the antenna and facilitates matching impedance between the antenna and the receiver and transmitter circuitries, the external matching component including at least one of the following inductors: a parallel inductor and a serial inductor.

5. The handheld device as defined in claim 4, further comprising a single antenna port that electrically couples the antenna to the external matching component.

6. The handheld device as defined in claim 4, wherein the open circuit antenna includes a headset.

7. The handheld device as defined in claim 1, wherein the auto-tune circuitry adjusts the transmission power of the transmitter circuitry based on the voltage output from the peak detector circuitry.

8. The handheld device as defined in claim 1, wherein the auto-tune circuitry includes at least one of the following devices: an auto-tune controller and a computing device, each of which or in combination receives the RSSI and voltage output from the receiver circuitry and the peak detector circuitry, respectively, and determines whether to adjust the passive component values of the network of electrical adjustable passive components and the transmission power of the transmitter circuitry.

9. The handheld device as defined in claim 1, wherein the peak detector circuitry includes a variable serial resistor and an analog-to-digital converter (ADC), the variable serial resistor being configured to receive and send the transmitting RF signals from the transmitter circuitry to the peak detector circuitry, which determines the voltage output of the transmitting RF signals, the ADC being configured to convert the voltage output to a digital signal and send the converted digital signal to the auto-tune circuitry, the auto-tune circuitry being further configured to adjust the variable serial resistor based on the converted digital signal.

10. The handheld device as defined in claim 1, wherein the auto-tune circuitry determines whether a headphone is electrically coupled to the handheld device based on the passive component values of the network of electrical adjustable passive components.

11. The handheld device as defined in claim 1, further comprising a switching circuit that is electrically coupled to the network of electrical adjustable passive components, receiver circuitry, and transmitter circuitry, the switching circuit being configured to isolate the receiver circuitry and the transmitter circuitry from each other based on whether the receiver circuitry is receiving RF signals or the transmitter circuitry is transmitting RF signals, respectively.

12. The handheld device as defined in claim 4, wherein the auto-tune circuitry includes either a controller, or a computing device having memory that includes an auto-tune manager and a processing device, the auto-tune manager including instructions executed by the processor device, the controller or the instructions of the auto-tune manager performing the following logic:
responsive to determining that a variable serial capacitor is not at its predetermined maximal value, incrementally adjusting a capacitance value of the variable serial capacitor, and maintaining an existing value and gain of a variable parallel capacitor and an amplifier of the transmitter circuitry, respectively;
responsive to determining that the variable serial capacitor is at its predetermined maximal value, determining whether the variable parallel capacitor is at its predetermined maximal value;
responsive to determining that the variable parallel capacitor is not at its predetermined maximal value, adjusting the variable serial capacitor to the predetermined minimal capacitance value of the variable serial capacitor, incrementally adjusting a capacitance value of the variable parallel capacitor and maintaining the existing gain of the amplifier;
responsive to determining that the variable parallel capacitor is at its predetermined maximal value, determining whether a stored power peak value is greater than or equal to a predetermined target power value; and
responsive to determining that the stored power peak value is less that the target power value, adjusting the variable 13. An integrated circuit comprising:
a variable parallel capacitor and a serial variable capacitor that receive RF signals;
a receiver circuitry that receives RF signals via the serial variable capacitor and determines the received signal strength indication (RSSI) of the RF signals;
a transmitter circuitry that transmits RF signals via the variable capacitors, a peak detector circuitry that receives and determines a voltage output of the RF signals from the variable capacitors; and
an auto-tune circuitry that receives the RSSI and output value from the receiver circuitry and the peak detector circuitry, respectively, the auto-tune circuitry being configured to adjust capacitance values of at least one of the variable serial and parallel capacitors based on the RSSI and the voltage output during the reception and transmission of the RF signals, respectively.

14. The integrated circuit as defined in claim 13, wherein the auto-tune circuitry tunes an antenna for receiving RF signals by first disabling the receiver circuitry and enabling the transmitter circuitry and peak detector circuitry, the auto-tune circuitry being configured to adjust the capacitance values of the at least one of the variable serial and parallel capacitors based on the voltage output of the peak detector circuitry during the transmission of the RF signals by the transmitter circuitry, once the antenna is tuned, the auto-tune circuitry being configured to disable the transmitter circuitry and peak detector circuitry and enable the receiver circuitry for receiving RF signals and/or tuning the antenna to the receiver circuitry.

15. The integrated circuit as defined in claim 13, further comprising:
an antenna that receives radio signals, the antenna including at least one of the following antennas: an open circuit antenna and a closed loop antenna; and
an external matching component that receives the RF signals from the antenna and facilitates matching impedance between the antenna and the receiver and transmitter circuitries, the external matching component including at least one of the following inductors: a parallel inductor and a serial inductor.

16. The integrated circuit as defined in claim 15, further comprising a single antenna port that electrically couples the antenna to the external matching component.

17. The integrated circuit as defined in claim 15, wherein the open circuit antenna includes a headset.

18. The integrated circuit as defined in claim 13, wherein the auto-tune circuitry adjusts the transmission power of the transmitter circuitry based on the voltage output from the peak detector circuitry.

19. The integrated circuit as defined in claim 13, wherein the auto-tune circuitry includes at least one of the following devices: an auto-tune controller and a computing device, each of which or in combination receives the RSSI and voltage output from the receiver circuitry and the peak detector circuitry, respectively, and determines whether to adjust the capacitance values of the at least one of the variable serial and parallel capacitors and the transmission power of the transmitter circuitry.

20. The integrated circuit as defined in claim 13, wherein the peak detector circuitry includes a variable serial resistor and an analog-to-digital converter (ADC), the variable serial resistor being configured to receive and send the transmitting RF signals from the transmitter circuitry to the peak detector circuitry, which determines the voltage output of the transmitting RF signals, the ADC being configured to convert the voltage output to a digital signal and send the converted digital signal to the auto-tune circuitry, the auto-tune circuitry being further configured to adjust the variable serial resistor based on the converted digital signal.

21. The integrated circuit as defined in claim 13, wherein the auto-tune circuitry determines whether a headphone is electrically coupled to the receiver and transmitter circuitries based on the capacitance values of at least one of the variable parallel capacitor and the variable serial capacitor.

22. The integrated circuit as defined in claim 13, further comprising a switching circuit that is electrically coupled to the variable serial capacitor, receiver circuitry, and transmitter circuitry, the switching circuit being configured to isolate the receiver circuitry and the transmitter circuitry from each other based on whether the receiver circuitry is receiving RF signals or the transmitter circuitry is transmitting RF signals, respectively.

23. A method for tuning an antenna for a frequency modulation transceiver, the method being implemented by either a controller, or a computing device having memory that includes an auto-tune manager and a processing device, the auto-tune manager including instructions executed by the processor device, the controller or the instructions of the auto-tune manager comprising the following logic:
responsive to determining that a first type of variable passive component is not at its predetermined maximal value, incrementally adjusting a component value of the first type of variable passive component, and maintaining an existing component value and gain of a second type of variable passive component and an amplifier of a transmitter circuitry, respectively;
responsive to determining that the first type of variable passive component is at its predetermined maximal value, determining whether the second type of variable passive component is at its predetermined maximal value;
responsive to determining that the second type of variable passive component is not at its predetermined maximal value, adjusting the first type of variable passive component to its predetermined minimal value, incrementally adjusting a component value of the second type of variable passive component and maintaining the existing gain of the amplifier;
responsive to determining that the second type of variable passive component is at its predetermined maximal value, determining whether a stored power peak value is greater than or equal to a predetermined target power value; and
responsive to determining that the stored power peak value is less that the target power value, adjusting the first and second types of variable passive components to their respective predetermined minimum values and incrementally adjusting the gain of the amplifier.

24. The method as defined in claim 23, further comprising:
responsive to determining that a transceiver is at the start of an automatic tuning mode, setting an auto-tune complete bit to "false," adjusting the first and/or second types of variable passive components and gain of the amplifier to their respective predetermined minimal values and sets stored power peak of the peak detector circuitry and best capacitance values to zero.

25. The method as defined in claim 24, further comprising:

responsive to determining that the transceiver already started the automatic tuning mode, determining whether the auto-tune complete bit is "true";

responsive to determining that the auto-tune complete bit is "true", adjusting the first and/or second types of variable passive components to the respective stored best values and maintaining the existing gain of the amplifier.

26. The method as defined in claim 25, further comprising:

responsive to determining that the auto-tune complete bit is "false", determining whether the first type of variable passive component is at its predetermined maximal value; and responsive to determining that the stored power peak value is greater than or equal to a predetermined target power value, setting the auto-tune complete bit to "true."

* * * * *